United States Patent
Rajagopalan et al.

(10) Patent No.: US 9,698,962 B2
(45) Date of Patent: Jul. 4, 2017

(54) TIMING ADVANCE TECHNIQUES FOR LARGE CELLS

(71) Applicant: QUALCOMM Incorporated, San Diego, CA (US)

(72) Inventors: Venkatraman Rajagopalan, San Diego, CA (US); Srikant Jayaraman, San Diego, CA (US); Ruoheng Liu, San Diego, CA (US); Rajakumar Ebenezar Devairakkam, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 14/705,296

(22) Filed: May 6, 2015

(65) Prior Publication Data

US 2015/0334707 A1 Nov. 19, 2015

(30) Foreign Application Priority Data

May 13, 2014 (IN) .......................... 2381/CHE/2014

(51) Int. Cl.
*H04L 5/14* (2006.01)
*H04W 72/04* (2009.01)
(Continued)

(52) U.S. Cl.
CPC ........... *H04L 5/14* (2013.01); *H04B 7/18506* (2013.01); *H04W 56/004* (2013.01);
(Continued)

(58) Field of Classification Search
CPC ..... H04L 5/14; H04L 5/1469; H04B 7/18506; H04W 56/004; H04W 72/0413; H04W 72/0446; H04W 72/12
See application file for complete search history.

(56) References Cited

U.S. PATENT DOCUMENTS

| 6,049,538 A | 4/2000 | Scott |
| 6,388,997 B1 * | 5/2002 | Scott .................... H04B 7/2615 370/280 |

(Continued)

FOREIGN PATENT DOCUMENTS

| EP | 2706692 A2 | 3/2014 |
| WO | WO-2013063789 A1 | 5/2013 |

OTHER PUBLICATIONS

ISA/EPO, International Search Report and Written Opinion of the International Preliminary Examining Authority, Int'l. App. No. PCT/US2015/029574, Aug. 13, 2015, European Patent Office, Rijswijk, NL, 11 pgs.

(Continued)

*Primary Examiner* — Duc C Ho
(74) *Attorney, Agent, or Firm* — Holland & Hart LLP

(57) ABSTRACT

Methods, systems, and devices are described for implementing timing advances in which a propagation delay may exceed a time period of a portion of a radio frame. In some examples, a transmitter may identify a timing advance indicating a time to initiate wireless uplink transmission of a subframe. Such a timing advance may compensate for a propagation delay between the transmitter and a receiver of the wireless uplink transmission. The timing advance may be applied as an integer component and a fractional component in relation to a duration of the subframe, to adjust the time to initiate the wireless uplink transmission of the subframe. The integer component may be used to adjust one or more subframe characteristics, and the fractional component that may be used to adjust the time to initiate the wireless uplink transmission of the subframe.

26 Claims, 14 Drawing Sheets

(51) Int. Cl.
 H04W 72/12 (2009.01)
 H04B 7/185 (2006.01)
 H04W 56/00 (2009.01)
(52) U.S. Cl.
 CPC ... *H04W 72/0413* (2013.01); *H04W 72/0446* (2013.01); *H04W 72/12* (2013.01); *H04L 5/1469* (2013.01)

(56) References Cited

U.S. PATENT DOCUMENTS

| | | | |
|---|---|---|---|
| 6,665,289 | B1 | 12/2003 | Sebire et al. |
| 2010/0027729 | A1* | 2/2010 | Murphy ............ H04W 56/0045 375/371 |
| 2011/0103291 | A1* | 5/2011 | Wiberg .............. H04B 7/15542 370/315 |
| 2011/0128873 | A1 | 6/2011 | Farag |
| 2014/0050186 | A1* | 2/2014 | Kim .................. H04W 56/0045 370/329 |
| 2014/0198757 | A1 | 7/2014 | Kim et al. |
| 2014/0301375 | A1 | 10/2014 | Nusairat et al. |
| 2014/0369317 | A1 | 12/2014 | Ye |
| 2015/0237626 | A1* | 8/2015 | Li ..................... H04W 72/0446 370/280 |

OTHER PUBLICATIONS

IPEA/EPO, Second Written Opinion of the International Preliminary Examining Authority, Int'l. App. No. PCT/US2015/029574, May 11, 2016, European Patent Office, Rijswijk, NL, 7 pgs.

* cited by examiner

TIMING ADVANCE TECHNIQUES FOR LARGE CELLS

CROSS REFERENCES

The present application for Patent claims priority to Indian Provisional Patent Application No. 2381/CHE/2014 by Rajagopalan et al., entitled "Timing Advance Techniques for Large Cells," filed May 13, 2014, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system).

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. A UE may both receive data from a base station (downlink) and transmit data to a base station (uplink).

In certain deployments it may be advantageous to have relatively large cells. For example, a system may operate to provide for Internet communication to aircraft by terrestrial air-to-ground (ATG) systems. In such cases, due to the altitude and speed at which an aircraft may travel, it may be desirable for cells within the system to have an expanded coverage area relative to a cell coverage area for terrestrial-based UEs. In such examples, propagation delay between a UE and a base station may become a significant portion of a radio frame that may be used for transmission of data. For example, if a system utilizes one millisecond subframes, a propagation delay that exceeds one millisecond may result in arrival of a subframe outside of a subframe boundary at a receiver. In some systems, a propagation delay of about 670 $\mu$s may be supported, with any propagation delay in excess of that limit not being supported. In order to provide a system that supports such relatively large cells and allows communications according to such established protocols, it may be desirable for systems to operate in environments in which a propagation delay may exceed a propagation delay limit associated with the wireless communications network.

SUMMARY

The described features generally relate to one or more improved systems, methods, or apparatuses for implementing timing advances in which a propagation delay may exceed a time period of a portion of a radio frame associated with a propagation delay limit. In some examples, a transmitter may identify a timing advance indicating a time to initiate a wireless uplink transmission of a subframe. Such a timing advance may compensate for a propagation delay between the transmitter and a receiver of the wireless uplink transmission. The timing advance may be applied as an integer component and a fractional component in relation to a subframe duration to adjust the time to initiate the wireless uplink transmission of the subframe. The integer component may be used to adjust one or more subframe characteristics, and the fractional component may be used to adjust the time to initiate the wireless uplink transmission of the subframe. A receiver that receives the subframe may receive the subframe substantially in synchronization with the reception of other subframes from other transmitters. The subframes may correspond to a sequence of time division duplexing (TDD) subframes or to a sequence of frequency division duplexing (FDD) subframes, according to some examples.

According to certain aspects of the disclosure, a method of wireless communication may include identifying a timing advance indicating a time to initiate a wireless uplink transmission of a subframe, applying the timing advance as an integer component and a fractional component in relation to a subframe duration to adjust the time to initiate the wireless uplink transmission of the subframe, and initiating the wireless uplink transmission of the subframe at the time indicated by the timing advance.

An apparatus for wireless communications is also provided, according to certain aspects of the disclosure. The apparatus may include means for identifying a timing advance indicating a time to initiate a wireless uplink transmission of a subframe, means for applying the timing advance as an integer component and a fractional component in relation to a subframe duration to adjust the time to initiate the wireless uplink transmission of the subframe, and means for initiating the wireless uplink transmission of the subframe at the time indicated by the timing advance.

According to other aspects of the disclosure, an apparatus for wireless communications may include a processor, memory in electronic communication with the processor and instructions stored in the memory. The instructions may be executable by the processor to identify a timing advance indicating a time to initiate a wireless uplink transmission of a subframe, apply the timing advance as an integer component and a fractional component in relation to a subframe duration to adjust the time to initiate the wireless uplink transmission of the subframe, and initiate the wireless uplink transmission of the subframe at the time indicated by the timing advance.

According to further aspects of the disclosure, a non-transitory computer-readable medium storing computer-executable code for wireless communications is described. The code may be executable by a processor to identify a timing advance indicating a time to initiate a wireless uplink transmission of a subframe, apply the timing advance as an integer component and a fractional component in relation to a subframe duration to adjust the time to initiate the wireless uplink transmission of the subframe, and initiate the wireless uplink transmission of the subframe at the time indicated by the timing advance.

A method, apparatus or non-transitory computer-readable medium as above is also described in which the application of the integer component may include adjusting the time to initiate the wireless uplink transmission of the subframe to correspond to an earlier downlink subframe boundary of a sequence of subframes. In some examples, the sequence of subframes may correspond to a sequence of TDD or FDD subframes. In certain examples, applying the timing advance as the fractional component may include advancing the time to initiate the wireless uplink by an amount that is less than the subframe duration. In other examples, applying the timing advance as the fractional component may include delaying the time to initiate the wireless uplink an amount that is less than the subframe duration.

The method, apparatus, or non-transitory computer-readable medium, in certain examples, may also apply the timing advance by determining that the identified timing advance exceeds a threshold value, incrementing the integer component, and calculating the fractional component as a difference between the identified timing advance and the incremented integer component. In some examples, the fractional component may be less than the subframe duration. Additionally or alternatively, the subframe may an uplink subframe transmitted from a user equipment to a base station, the user equipment may include an aircraft transmitter, and the base station may include a ground station. In some examples, the wireless uplink transmission may include a transmission on one or more of a physical random access channel (PRACH), a physical uplink shared channel (PUSCH), or a physical uplink control channel (PUCCH), a demodulation reference signal (DMRS) associated with the PUSCH or PUCCH, or a sounding reference signal (SRS) transmission.

The method, apparatus, or non-transitory computer-readable medium, in certain examples, may also compare the identified timing advance to a threshold value and determine an adjustment to the integer component based at least in part on the comparison. In this or other examples, the method, apparatus, or non-transitory computer-readable medium may also calculate the fractional component as a difference between the identified timing advance and an adjusted integer component based on the determined adjustment.

The method, apparatus, or non-transitory computer-readable medium, in certain examples, may also receive timing advance information from an internal source and receive timing advance information from an external source. Identifying the timing advance may be based at least in part on the timing advance information received from the internal source and the external source. The method, apparatus, or non-transitory computer-readable medium may also receive timing advance information from a base station that is separate from the external source. In such a case, identifying the timing advance may be based at least in part on the timing advance information from the base station. The timing advance information of the external source may include at least one of position, velocity, and acceleration.

In various examples, the subframe may be an initial uplink subframe and the sequence of subframes may correspond to a sequence of uplink TDD subframes. Some examples may include identifying a further timing advance of one or more subsequent uplink subframes relative to a timing advance of the initial uplink subframe. In some examples, the method, apparatus, or computer readable medium may determine that the further timing advance comprises a change in the integer component and apply the further timing advance during one or more downlink subframes. The change in the integer component, for example, may be staggered over a plurality of downlink subframes. In further examples, uplink data processing may be performed on the subframe prior to initiating the wireless uplink transmission of the subframe, the uplink data processing performed according to a maximum value of the integer component, and a portion of the uplink data processing may be stalled when the integer component is less than the maximum value of the integer component. In certain examples, the timing advance may be received from a timing advance generator.

In various examples, identifying the timing advance may include receiving timing advance information from one or both of a first external source and a second external source and identifying the timing advance based at least on the timing advance information received from one or both of the first external source and the second external source. In certain examples, identifying the timing advance may include obtaining at least one of position, velocity, and acceleration from an external source and identifying the timing advance based at least on the at least one of position, velocity, and acceleration Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to one or more improved systems, methods, or apparatuses for implementing timing advances in which a propagation delay may exceed a time period of a portion of a radio frame associated with a propagation delay limit. In some examples, a transmitter may identify a timing advance indicating a time to initiate a wireless uplink transmission of a subframe. Such a timing advance may compensate for a propagation delay between the transmitter and a receiver of the wireless uplink transmission.

The timing advance may be applied as a fractional component, an integer component, or an integer component and fractional component in relation to a subframe duration to adjust the time to initiate the wireless uplink transmission of the subframe. The integer component may be used to adjust one or more subframe characteristics, and the fractional component that may be used to adjust the time to initiate the wireless uplink transmission of the subframe. A receiver that receives the subframe may receive the subframe substantially in synchronization with the reception of other subframes from other transmitters. The subframes may correspond to a sequence of time division duplexing (TDD) subframes or to a sequence of frequency division duplexing (FDD) subframes, for example.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
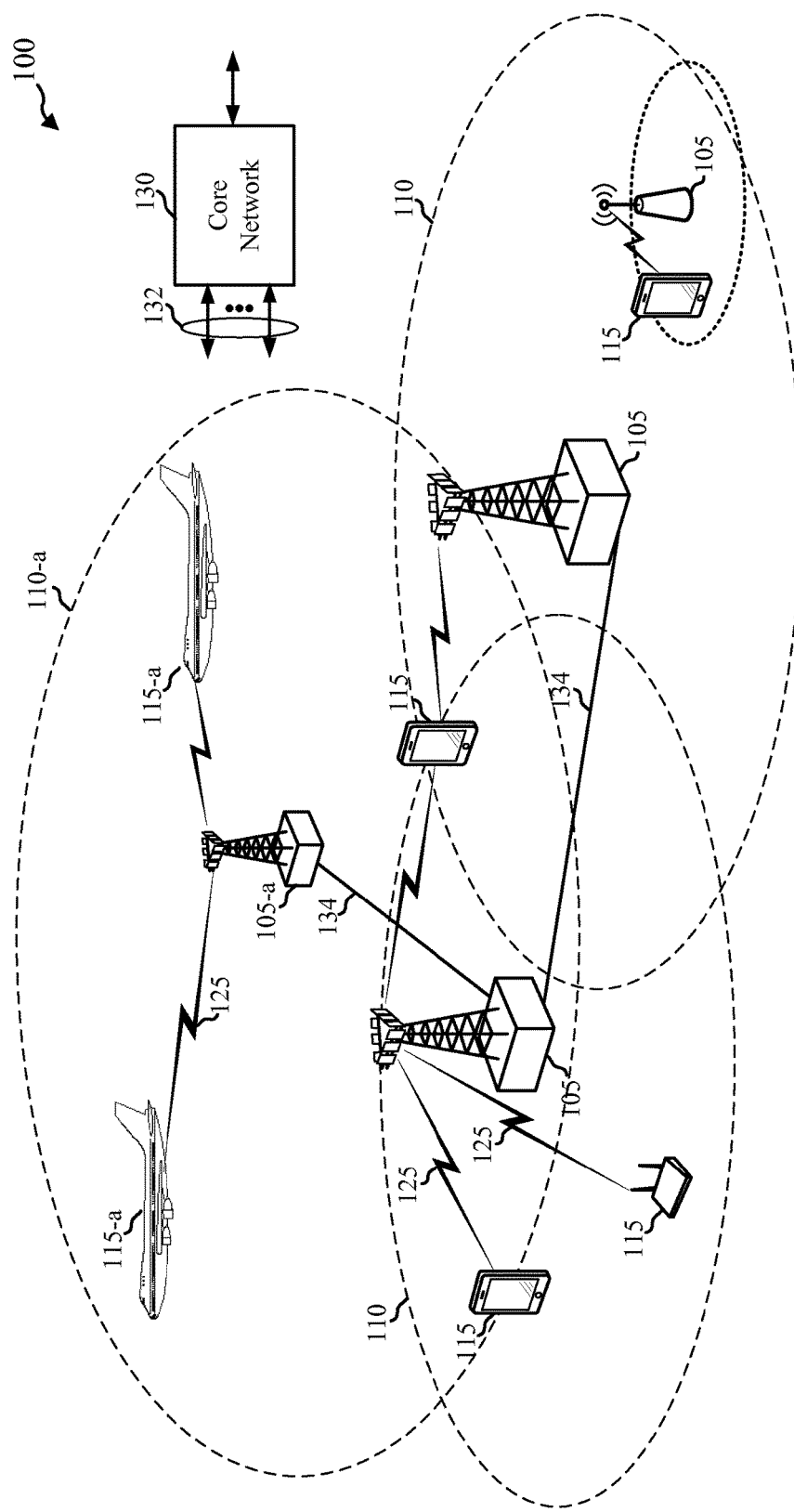
FIG. 1 illustrates an example of a wireless communications system in accordance with various aspects of the disclosure.

FIG. 1 illustrates an example of a wireless communications system 100 in accordance with various embodiments. The wireless communications system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various embodiments. In some aspects, the wireless communications system 100 may provide ATG communications between UEs 115-a implemented as an aircraft (or other airborne object) transceiver and a base station 105-a. In order to accommodate the relative high speed of aircraft, a coverage area 110-a associated with base station 105-a may be increased relative to coverage areas 110 of base stations communicating with terrestrial UEs 115. Such increased coverage areas 110-a may result in propagation delays of UEs 115-a close to a cell edge that may be compensated using timing advances in accordance with various aspects of the present disclosure.

Base stations 105 may communicate control information or user data with the core network 130 through backhaul links 132. In some examples, the base stations 105 may communicate, either directly or indirectly, with each other over backhaul links 134, which may be wired or wireless communication links. The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc.

Wireless communications may be performed according to a protocol that transmits data according to radio frames, which may be divided up into multiple subframes. For example, in Long Term Evolution (LTE) systems, a frame structure may include ten subframes of data that are transmitted in a radio frame. Each subframe may be 1 millisecond (ms) in duration, and may include control signaling as well as data that is transmitted between a UE 115 and base station 105. In the event that a timing advance exceeds the duration of a subframe, according to various examples, the timing advance may be implemented as an integer component associated with an integer number of subframes and a fractional component associated with a fractional portion of subframes, as will be described in more detail below. In some examples, the timing advance may not exceed the duration of a subframe, but may exceed a timing advance limit and may be implemented as an integer timing advance and a fractional retard, as will be described in more detail below.

The base stations 105 may wirelessly communicate with the UEs 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up a portion of the coverage area (not shown). The wireless communications system 100 may include base stations 105 of different types (e.g., macro, micro, or pico base stations). There may be overlapping coverage areas for different technologies. The wireless communications system 100 may be a Heterogeneous LTE/LTE-A network in which different types of base stations provide coverage for various geographical regions.

The core network 130 may communicate with the base stations 105 via a backhaul 132 (e.g., S1, etc.). The base stations 105 may also communicate with one another (e.g., directly or indirectly) via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be an aircraft transceiver, a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in wireless communications system 100 may include UL transmissions over UL carriers from a UE 115 to a base station 105, or DL transmissions, from a base station 105 to a UE 115 over DL carriers. The system may utilize, in some examples, FDD or TDD. The downlink transmissions may also be called forward link transmissions while the uplink transmissions may also be called reverse link transmissions. According to various aspects of the disclosure, a UE 115 may implement a timing advance on uplink transmissions in order to provide an uplink transmission received at the base station 105 that is substantially synchronized with other received uplink transmissions. In situations where the UE 115 may be located at greater distances from the base station 105, the timing advance will be larger than closer-in UEs 115, due to larger propagation delay. In deployments where one or more base stations 105 may be communicating with UE 115-a that is located on an aircraft or is an aircraft transceiver, the coverage area 110 of a serving cell may be relatively large, and in some examples may result in a maximum value of the timing advance to be larger than one subframe or being larger a maximum timing advance supported by the UEs 115. In such cases, as will be described in further detail below, the UE 115-a may implement a timing advance as an integer component that is used to adjust one or more subframe characteristics, and a fractional component that may be used to adjust the time to initiate the wireless uplink transmission of the subframe.

As mentioned above, a timing advance may be required to compensate for propagation delay between a UE and a base station, with the UE implementing the timing advance so as to provide uplink transmissions that arrive at a base station within a specified synchronization with other uplink transmissions from other UEs. The base station may thus maintain proper timing of communications between multiple UEs. Timing advance, in some examples of an air-to-ground communication system, may be applied to any uplink physical signals or uplink physical channels. For example, timing advance may be applied at various distinct scenarios in various air-to-ground data communications. These scenarios may include, for example, in an initial network access by using Physical Random Access Channel (PRACH), in a first shared channel uplink transmission in a connected state, in periodic timing advance updates to a physical uplink shared channel (PUSCH) or physical uplink control channel (PUCCH) in a connected state, using PRACH during a handover from a serving cell to a target cell, using PRACH after a radio link failure (RLF) or an out-of-sync, and in a first uplink shared channel transmission following a handover, a RLF, or an out-of-sync.

Due to the relatively fast changes in timing advance required for an aircraft transceiver, in some examples, an external source, such as a timing advance generator, may provide timing advance information for a UE. In some cases, the timing advance information may include position, velocity, or acceleration of the UE or a vehicle associated with the UE (e.g., an aircraft 115). The timing advance generator may obtain timing advance information from an external entity, such as the navigation system of an aircraft. Such a timing advance generator may provide timing information that represents the delay between a given base station and the UE located in the aircraft, using the global positioning system (GPS) position of the aircraft and prior knowledge of the GPS position of base stations nearby that may be used for wireless communication. Such a timing advance generator may provide the timing information periodically during the entire session between the UE and the base station, and the actual timing advance to be applied may be derived for each of the above-noted time instances. Additionally, the base station may also send updates to timing advance as defined in the LTE standard. In some aspects, the timing advance may be obtained from a combination of one or more internal timing advance components (e.g., a received time tracking loop) or external sources. In one example, the timing advance may be determined by using information from a base station, an internal receiver time tracking loop, and the timing advance generator, or any combination thereof. For example, the timing advance may be obtained by utilizing (e.g., combining) information from an internal receiver time tracking loop and the timing advance generator. The combination of the information from the external sources may be linear or non-linear.

In certain examples, timing advance requirements can be of the order of 0 to 2.1 ms, which may provide for a maximum cell size coverage of 350 kilometers. In other examples, larger cell sizes may be supported, with associated timing advances larger than 2.1 ms. According to various deployments, the frame structure for transmissions may be modified to allow for increased propagation delay, so as to provide sufficient time for signal transmissions and transitions. Additionally, in connected mode, a base station may not be able to report a timing slew greater than +/−16 µs for a PUSCH or PUCCH transmission over a measurement period since the timing advance command defined in the LTE standard has timing adjustment limit [−31×16, 32×16] Ts (except the case of random access response). According to the LTE standards, Ts=1/(15000*2048) seconds. Thus, when the timing advance is applied, in some examples, it may be applied in such a way that a base station does not perceive a change in UL timing in excess of the limits allowed by LTE standard in connected mode over a measurement period.

According to various implementations of the LTE standard, for uplink transmissions, a maximum timing advance may be established that is approximately 670 µs (20512*Ts). Furthermore, as noted, the subframe duration in such systems is 1 ms. Accordingly, a 2.1 ms maximum timing advance such as described above for an air-to-ground system is a non-standard timing advance and moreover is beyond the sub-frame duration. In some cases, timing advance may not be supported for random access channel transmissions (e.g., according to the LTE standard). However, an air-to-ground system may utilize a timing advance as described herein so that standard-defined physical random access channel (PRACH) formats may support a large cell size. Accordingly, although many of the examples described herein are discussed with respect to PUSCH transmissions, these concepts may also be applied to any uplink physical signals or their variants, such as PRACH, physical uplink control channel PUCCH, demodulation reference signal (DMRS), and sounding reference signal (SRS) transmissions as well.

Figure 2:
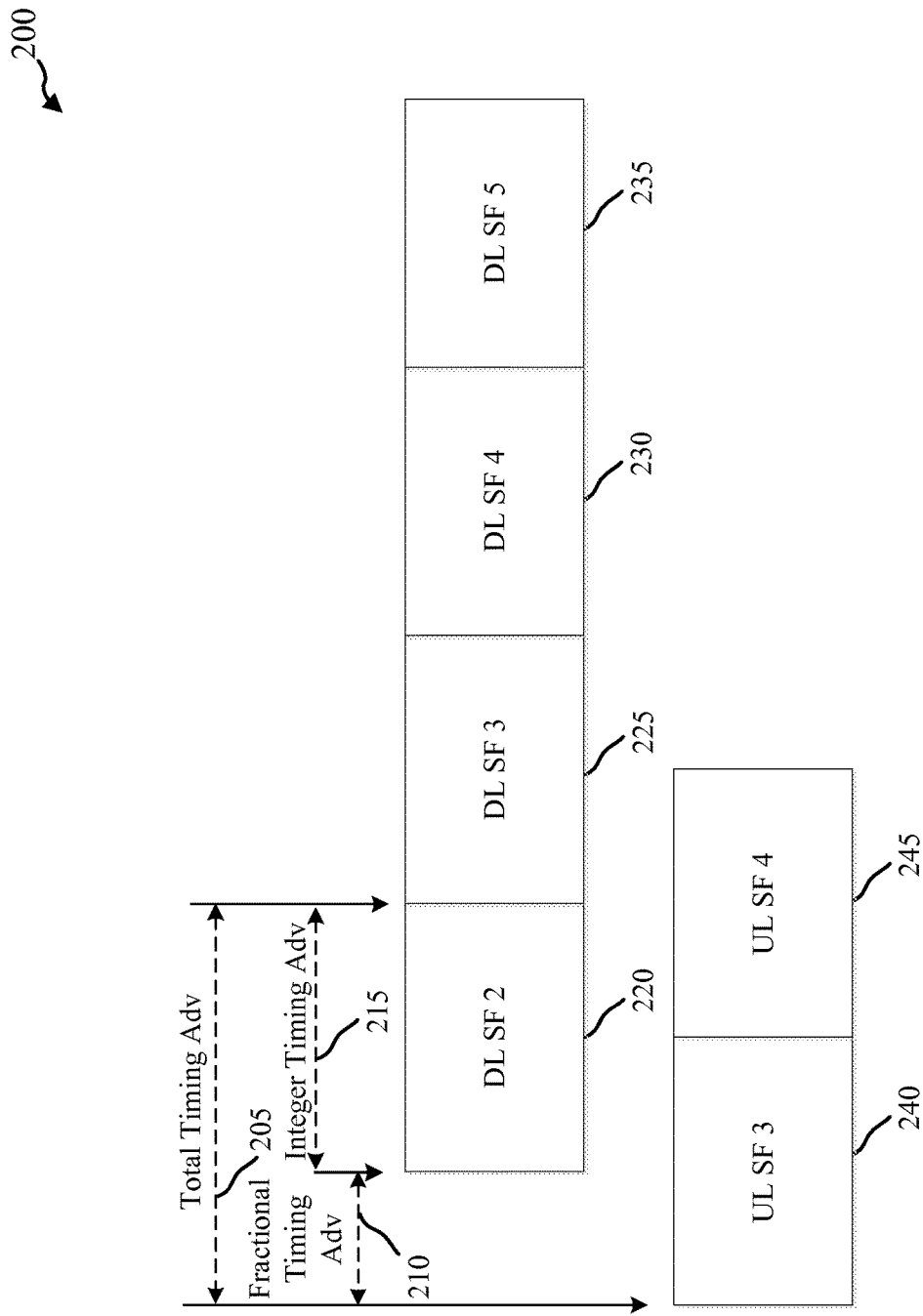
FIG. 2 illustrates an example of a timing advance relative to uplink and downlink subframes in a wireless communication system in accordance with various aspects of the disclosure.

FIG. 2 is an illustration of an example 200 of a timing advance implemented as an integer timing advance and a fractional timing advance relative to uplink and downlink subframes in accordance with various aspects of the disclosure. In this example, the total timing advance 205 may be in excess of 1 ms, and may be decomposed into two portions, an integer portion 215 and a fractional portion 210 and applied by a UE, such as a UE 115 of FIG. 1, to an uplink transmission. In this example, downlink (DL) subframes 2 through 5 220-235 are illustrated relative to uplink subframes 3 and 4 (i.e., uplink subframes 240, 245). The integer portion 215 of the timing advance 205 may be implemented as an advance in the UL subframe timing number compared to the downlink subframe. The fractional timing advance 210 may be the portion that is less than 1 ms, which when combined with the integer timing advance 215 realizes the total timing advance 205. The fractional timing advance 210, in some examples, may be implemented as a retard/advance on the uplink subframe timing, as applicable within the sub-frame, subject to the timing constraints of LTE UE implementation/architecture.

Thus, together with the integer portion 215, the complete range of timing advances may be covered. The uplink subframes 240, 245 may be PUSCH subframes, for example. In addition, in some implementations the LTE PRACH does not support any timing advance. According to some examples, such a timing advance 205 may be implemented during PRACH transmissions as well, with similar timing advance 205 breakdowns used to realize the total timing advance 205 (after any bias has been applied, according to some deployments). In some cases, bias may refer to a small reduction in the applied timing advance to account for delay reduction during the time of a PRACH request to response time period. Thus, both an integer component 215 and a fractional component 210 of a timing advance 205 may be applied on PRACH transmissions, with integer component 215 implemented as an uplink subframe advance, and fractional component 210 implemented as a timing advance/retard to an uplink process signal generation timing advance. Additionally, for PRACH/PUSCH/PUCCH/DMRS/SRS transmissions, the solution may apply the derived uplink timing advance 205 starting with the first scheduled uplink frame of any radio frame, or at any other particular uplink subframe of a radio frame, providing the previous uplink frame is muted or not scheduled. In some cases, when previous uplink subframes are present, the timing advance changes may adhere to the overall requirement of base station timing advance slew rate limits specified in LTE standards. Subsequent uplink subframes may, in some examples, have changes in total timing advance required, as compared to first uplink subframe.

According to various examples, the integer component of the timing advance may be implemented by adjusting one or more subframe dependent parameters associated with a subframe. For example, certain subframes within a radio frame may have specific parameters, such as a scrambling sequence, that identify the subframe in the sequence of subframes of the radio frame. Thus, the integer component may be implemented by changing the subframe dependent parameters to correspond with the subframe number prior to applying the integer timing advance. In such a manner, the wireless uplink transmission of the subframe may be adjusted to correspond to an earlier downlink subframe boundary of a sequence of subframes. Such an adjustment may be implemented though uplink processing of the subframes, which may be advanced by multiples of a subframe (e.g., the adjustment may be an integer timing advance of one or two subframes in PUSCH or PUCCH). The subframe dependent parameters defined in the LTE standard, such as scrambling sequence, etc., may thus be generated based on the subframe of the signal as seen in the base station after channel delay. A subframe of the signal as seen by the base station after channel delay may be referred to herein as a "true base station subframe." A listing of subframe dependent parameters as applicable to PRACH/PUSCH/PUCCH and DMRS signals are given in Table 1.

TABLE 1

|  | PRACH | PUSCH | PUCCH format 1, 1a, 1b | PUCCH format 2, 2a, 2b | DMRS |
| --- | --- | --- | --- | --- | --- |
| Scrambling | — | Yes | — | Yes | — |
| Cyclic shift of base sequence | No | — | Yes | Yes | Yes |
| Group hopping of base sequence | — | — | Yes (if enable) | Yes (if enable) | Yes (if enable) |
| sequence hopping of base sequence | — | — | — | — | Yes (if enable) |
| Orthogonal sequence index selection | — | — | Yes | — | Yes (only for PUCCH format 1, 1a, 1b) |
| Modulation | — | No | No | No | — |
| Resource element mapping | No | Yes (if frequency hopping enable) | No | No | No |
| SC-FDMA signal generation | No | No | No | No | No |

In Table 1, an indication of yes indicates that the corresponding uplink physical channel processing depends on subframe index, and in indication of no indicates that the corresponding uplink physical channel processing does not depend on subframe index According to certain examples, when the generated PUSCH signal is advanced by one or two subframe(s) to achieve 1 or 2 ms integer timing advance, the actual subframe dependent parameters used to generate those signals are not based on the subframe after the advance is applied but instead are based on a subframe number prior to the timing advance. As described above, this subframe number prior to the timing advance may be referred to as the "true base station subframe," because, when an uplink signal is sent at a time determined by estimated timing advance appropriate for the delay in the channel, the base station will receive the signal at the subframe number prior to generating the timing advance (true base station subframe) as if the channel had no delay.

Figure 3:
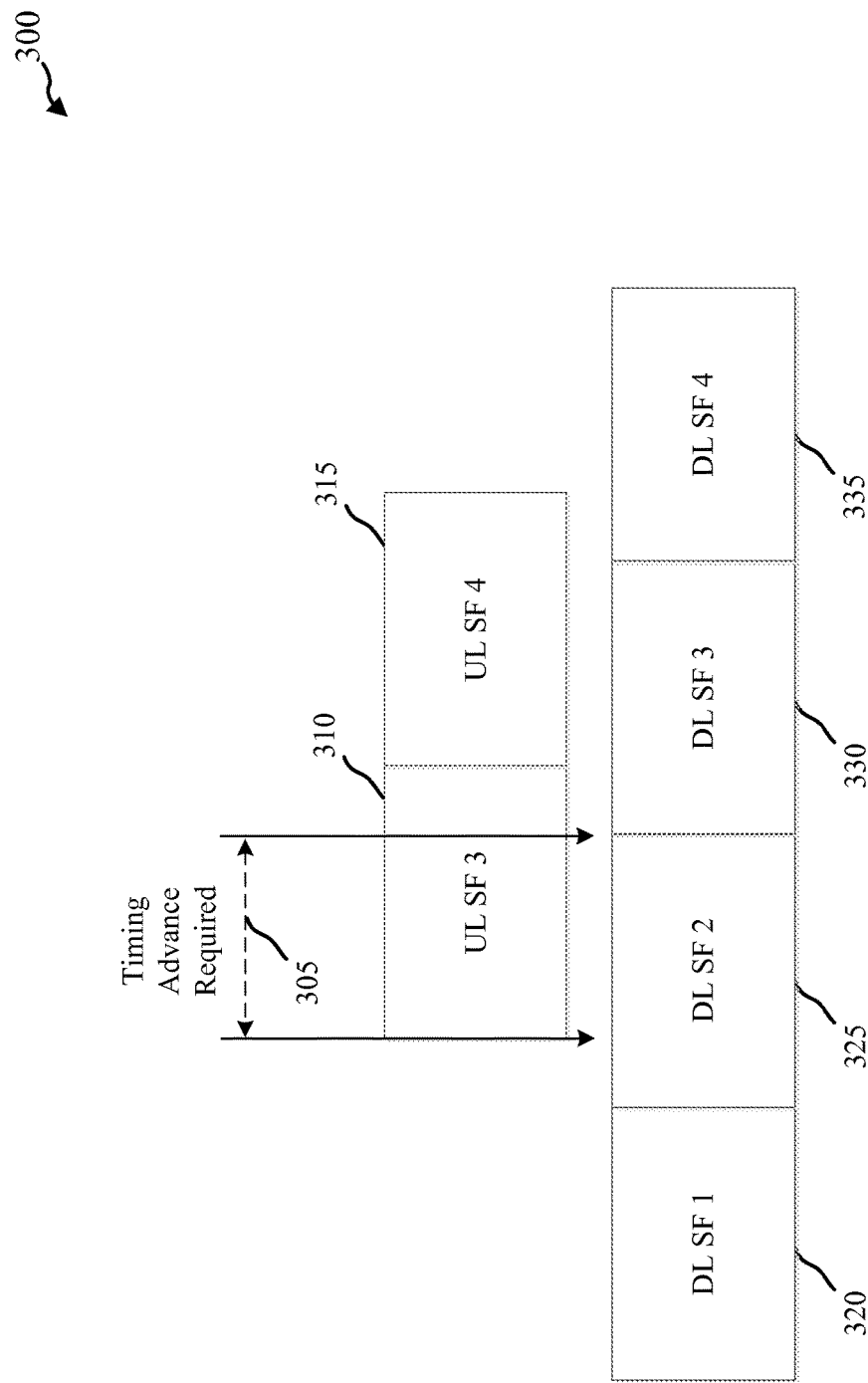
FIG. 3 illustrates an example of a fractional timing advance relative to uplink and downlink subframes in a wireless communication system in accordance with various aspects of the disclosure.

With reference now to FIG. 3, an illustration of an example 300 of a fractional timing advance is discussed in accordance with various aspects of the disclosure. In this example, a fractional component 305 may be used to adjust the time to initiate the wireless uplink transmission of uplink subframes 310, 315 relative to downlink subframes 320-335. As mentioned above, the standard LTE UE implementations may have limits on the fractional component 305 of a timing advance that may be applied to a uplink subframe that are approximately 670 μs (or slightly greater, depending upon UE implementation restrictions). This limit is referred to herein as FracTALimit. Thus, timing advances that are less than FracTALimit may be implemented as an advance in the UL subframe signal generation timing as shown in FIG. 3, and may be performed according to established LTE UE implementations, such as at a UE 115 of FIG. 1. Applying fractional component 305 in conjunction with one or more integer components of the timing advance may achieve timing advances in excess of one subframe.

Figure 4:
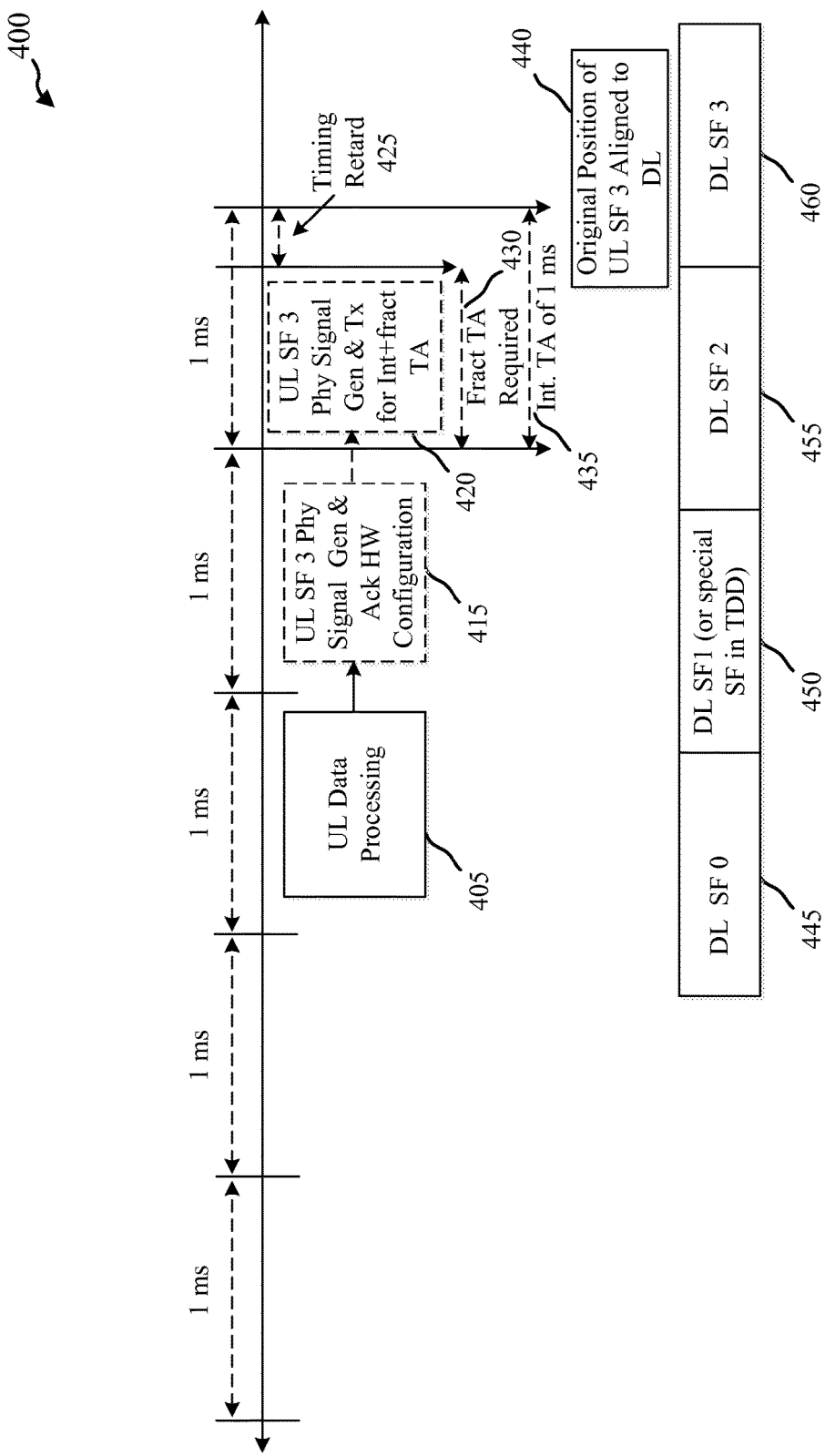
FIG. 4 illustrates an example of a fractional timing retard in conjunction with an integer timing advance relative to uplink and downlink subframes in a wireless communication system in accordance with various aspects of the disclosure.

However, in some cases the fractional component of the timing advance is greater than FracTALimit but less than one. In such scenarios, the full range of the fractional component of the timing advance is 0 to 1 ms. With reference now to FIG. 4, an example 400 of such a situation is described in accordance with various aspects of the disclosure. In some examples, fractional components in excess of FracTALimit may be implemented by a UE, such as a UE 115 of FIG. 1, through advancing the timing advance by one full integer, and delaying the initiation time of transmission by the difference between the fractional component and integer component. Thus, the fractional component 430 of FIG. 4 may be implemented through applying an integer component 435 and applying a timing retard 425 in the uplink subframe signal generation timing for a value that is equal to 1-TA, relative to downlink subframes 445-460. TA may be the total fractional timing advance required in units of milliseconds (ms). Thus, the base station, after the channel delay, would see no effective receive frame timing error/offset.

Thus, for a required timing advance beyond the Frac-TALimit, the solution may be implemented as an integer timing advance with an appropriate timing retard. FIG. 4 also illustrates an example of an uplink data processing pipeline in the UE. As illustrated, the UE uplink physical signal generation tasks are spread over subframes prior to a true base station subframe. At block 405, the UE may perform uplink (UL) data processing prior to actual uplink physical signal generation. Such data processing may include, for example, internet protocol (IP), packet data convergence protocol (PDCP), radio resource control (RRC), radio link control (RLC), media access control (MAC) processing, and control information generation. At block 415, the UE may perform UL SF 3 Physical layer data and control processing, at a time that is one subframe in advance of transmission. However, due to the presence of the integer component 435 of the timing advance, the processing at block 415 may be stalled, and the physical signal generation and acknowledgement hardware configuration performed at block 420. The original position of the uplink subframe aligned to downlink is indicated at block 440.

Figure 5:
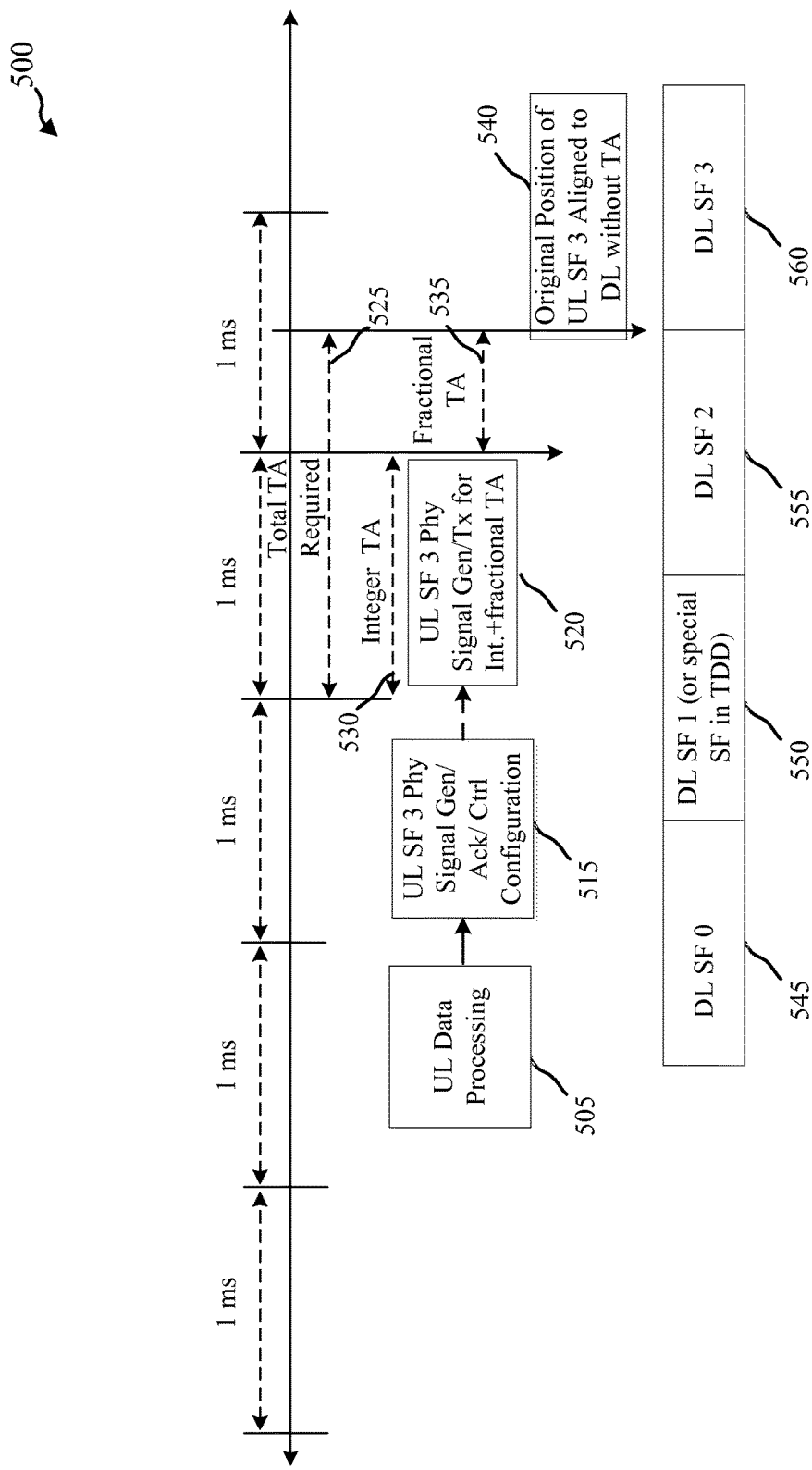
FIG. 5 illustrates an example of an integer and a fractional timing advance relative to uplink and downlink subframes in a wireless communication system in accordance with various aspects of the disclosure.

With reference now to FIG. 5, implementation 500 of a timing advance greater than 1 or 2 ms is described in accordance with various examples. When a total timing advance 525 is greater than one or two integer components 530 (equivalent to 1 or 2 ms), the timing advance 525 may be implemented by a UE, such as a UE 115 of FIG. 1, as a combination of integer component 530 and fractional component 535. The uplink data processing pipeline in the UE, in such examples, may be spread over subframes prior to a true base station subframe, with the physical generation modified. At block 505, the UE may perform uplink (UL) data processing prior to actual uplink physical signal generation, similarly as discussed above with respect to FIG. 4. At block 515, the UE may perform UL SF 3 Physical layer data and control processing, at a time that is two subframes in advance of transmission. At block 520, the UE may perform physical signal generation and transmission incorporating both the integer and fractional components of timing advance 525. The original position of the uplink subframe aligned to downlink without timing advance is indicated at block 540, with downlink subframes indicated at blocks 545-560.

Once the initial timing advance is applied using one of the methods described above, the UE may continue to use information from the timing advance generator as a primary source for deriving the timing advance. In some cases, the UE may use timing advance information from one or more internal or external entities to derive the timing advance. For example, the UE may use the timing advance generator information in conjunction with TA adjustments received from a base station as defined in baseline LTE, which has a range of approximately +/−16 μs. Additionally or alternatively, the timing advance may be derived based at least in part on timing advance information from an internal receiver time tracking loop. Thus, the timing advance may be determined using information from any combination of external or internal sources (e.g., base stations, time tracking loops, GPS etc.). In some cases, the timing advance information may include position, velocity, or acceleration of the UE. Whenever the new required timing advance changes or crosses the 'x'+FracTALimit boundary, where 'x' is an integer value with the unit millisecond, the UE may switch from fractional timing advance to integer timing advance. This may or may not result in a connection failure and subsequent connection re-establishment. According to various examples, such transitions may be implemented while maintaining a connection.

Figure 6:
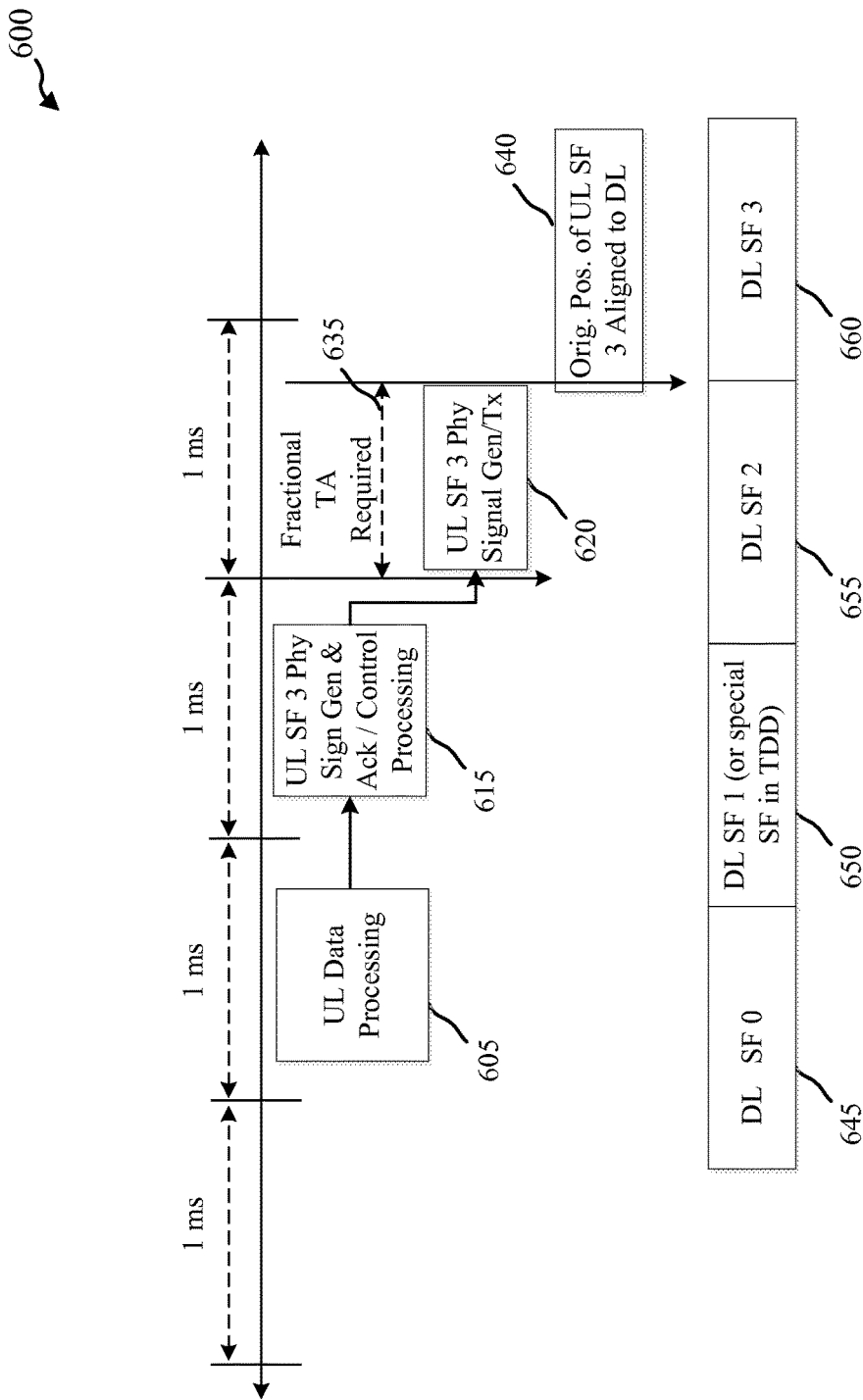
FIG. 6 illustrates an example of subframe processing for a fractional timing advance relative to uplink and downlink subframes in a wireless communication system in accordance with various aspects of the disclosure.

With reference now to FIG. 6, an example 600 of an integer to fractional timing advance boundary transition is discussed. According to various examples, call drops may be avoided during integer to fractional timing advance boundary transitions and vice-versa, for a TDD system. In some cases, the UE, such as a UE 115 of FIG. 1, may perform uplink data processing according to the established data processing pipeline when it receives a data and then sends the data over the air. An example of such a data processing pipeline sequence for a TA that is less than the FracTALimit is illustrated in FIG. 6. Similarly as discussed above, such a data processing pipeline may be spread over subframes prior to a true base station subframe. At block 605, the UE may perform uplink (UL) data processing prior to actual uplink physical signal generation, similarly as discussed above with respect to FIG. 4. At block 615, the UE may perform UL SF 3 Physical layer data and control processing, at a time that is one subframe in advance of transmission. At block 620, the UE may perform the physical signal generation transmission. The timing advance 635 may be applied to the physical signal generation and transmission, and the original position of the uplink subframe aligned to downlink is indicated at block 640, with downlink subframes indicated at blocks 645-660.

According to various examples, in order to simplify the processing of the pipeline as the timing advance is applied to changes from a fraction to integer or vice versa, the pipeline is modified to ensure that all UL processing at blocks 605, 610, 615 happens assuming there is a maximum integer timing advance of 2 ms. In some examples, the maximum may be reduced to 1 ms if it is known that the cell size for a particular base station, such as a base station 105 of FIG. 1, does not require 2 ms of TA. When the required TA is less than 'x'+FracTALimit, ('x' is an integer value), an additional sub-frame stall of 2 or 1 (2−'x') ms may be introduced in the pipeline and in the last stage at block 620 (i.e., only a fractional timing advance is applied). For example, when the required TA is 2 ms, the pipeline is setup to have a 2 subframes advance and no stall is required. This simplifies the implementation and may ensure that only the last stage of processing, the physical signal generation block 620, needs to be aware of the instantaneous timing advance position. Accordingly, as shown in this example, the other blocks 605-615 are processed two subframes in advance, or one subframe in advance, depending upon the cell size. Although described with respect to one or two subframes, the techniques described herein may be implemented for timing advances of other values, (e.g., three subframes), providing that the frame structure is changed accordingly. According to various implementations of air-to-ground communications systems, the overall minimum HARQ round trip time is increased correspondingly in order to compensate the longer propagation delay. For example, the overall minimum HARQ round trip time can be increased to 6 sub-frames, and therefore an advance of 1 or 2 ms in data processing pipeline is possible.

Figure 7:
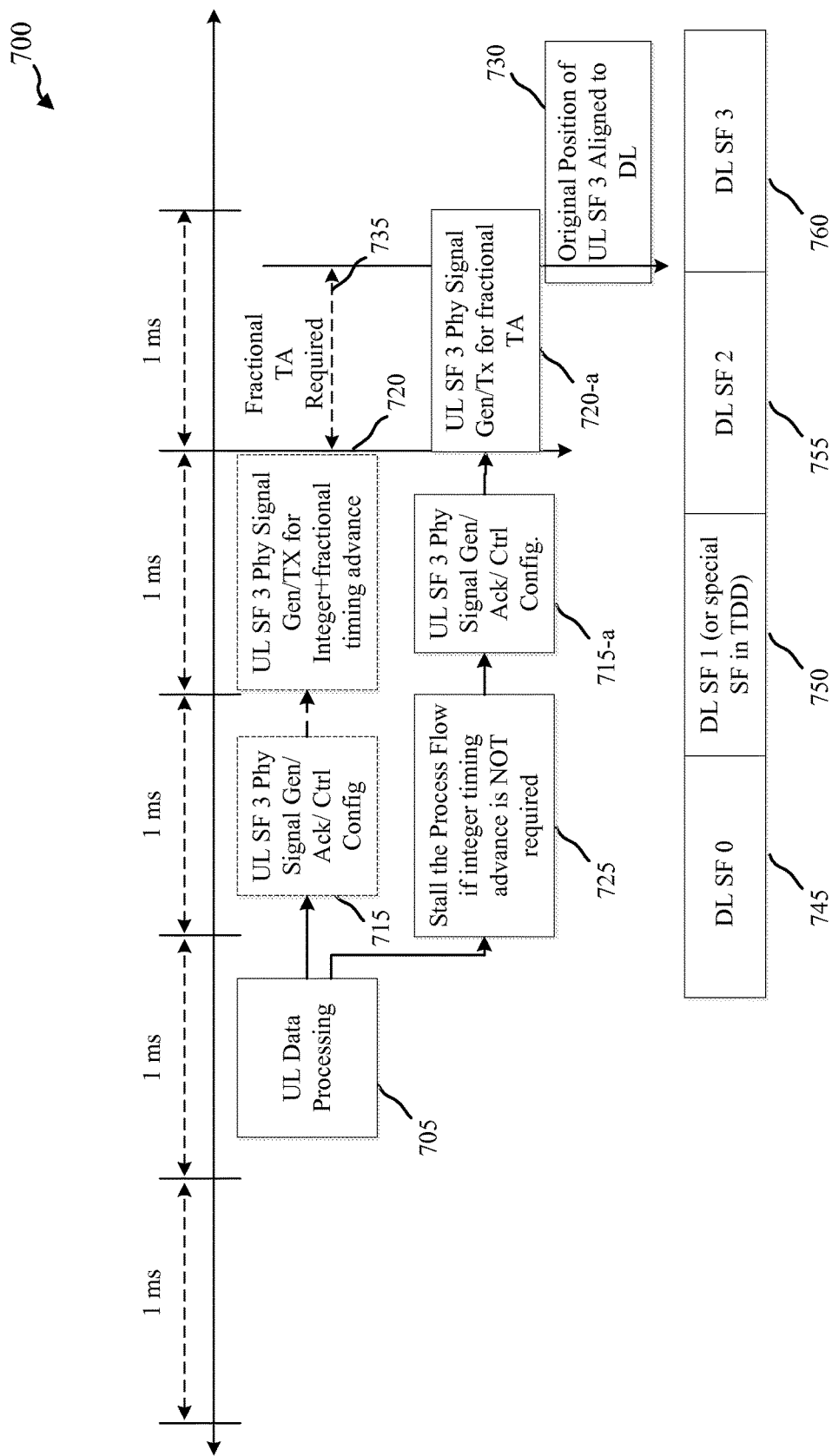
FIG. 7 illustrates an example of subframe processing for an integer plus a fractional timing advance relative to uplink and downlink subframes in a wireless communication system in accordance with various aspects of the disclosure.

Referring now to FIG. 7, an example 700 of the data processing pipeline for the two cases of timing advance is described. In example 700, the two cases may implement timing advances that are less than the FracTALimit with a 1 ms stall, and timing advances greater than 1 ms but less than (1+FracTALimit) with no stall for a cell size with maximum timing advance of 1+FracTALimit. Similarly as discussed above, such a data processing pipeline may be spread over subframes. At block 705, the UE may perform uplink (UL) data processing prior to actual uplink physical signal generation, similarly as discussed above with respect to FIG. 4. At block 715, the UE may perform the physical signal generation and acknowledgement hardware configuration, at a time that is one subframe in advance of transmission. At block 720, the UE may perform the physical signal generation transmission. The fractional component 735 of the timing advance may be applied to the physical signal generation and transmission of block 720. The original position of the uplink subframe aligned to downlink is indicated at block 730, with downlink subframes indicated at blocks 745-760. If an integer timing advance is not required, processing of block 715 may be stalled, as indicated at block 725, and processing of blocks 715 and 720 may be stalled and performed as indicated at blocks 715-a and 720-a.

FIG. 4 described the data processing pipeline for a TA greater than FracTALimit and a TA of less than 1 ms for a system with a maximum required TA range of 1+FracTALimit. Since that is implemented effectively as an integer component of the timing advance as described earlier, that scenario also does not need a stall when considered in the context of a system with maximum required TA of 1+FracTALimit. If the range of an air-to-ground system has to be extended for a maximum timing advance requirement of 2.1 ms, the concept described above can be extended. For example, when the required TA is less than the FracTALimit, the maximum stall for fractional timing advance may be 2 ms. When the required TA is greater than the FracTALimit but less than [1+FractTALimit] the maximum stall may be 1 ms. In some cases, there may not be a stall (e.g., when the required TA is greater than [1+FracTALimit] but less than 2.1 ms).

When a timing advance changes dynamically from less than [x+FracTALimit] to more than [x+FracTALimit], or vice-versa, with 'x' being an integer value, an UL timing advance may be changed to an UL timing retard or vice-versa. Such a change may be done without affecting the slew rate restrictions on the channel and may be limited by UE implementation restrictions. For example, as the UE crosses the boundary from timing advance to timing retard, the transition may result in a connection failure and connection re-establishment. In some examples, a TDD based system, such as certain implementations of wireless communications system 100 of FIG. 1, may stagger the UL timing over available TDD DL subframes so that actual uplink transmission is not affected, and connection failures may be avoided.

Figure 8:
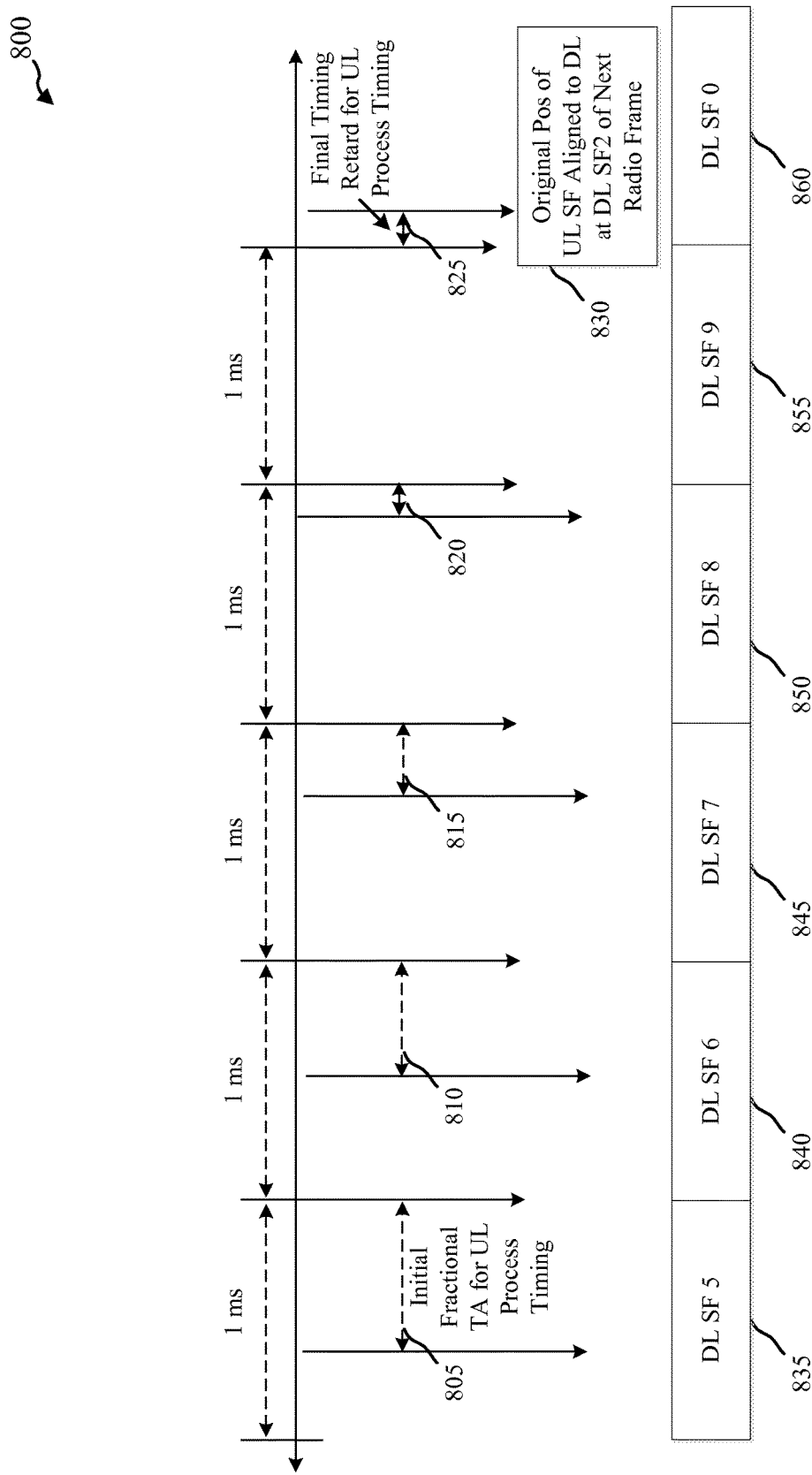
FIG. 8 illustrates an example of staggering implementation of a timing advance relative to uplink and downlink subframes in a wireless communication system in accordance with various aspects of the disclosure.

Such a staggering technique is illustrated in FIG. 8, in which an example 800 of staggering is illustrated. In this example, an initial fractional TA component 805 is established, and a TA adjustment may require incrementing the integer component and implementing a retard as the fractional component. The integer component may be implemented, and a final timing retard 825 may be staggered over TAs 810, 815, 820, through downlink subframes 835-860. The original position of the UL subframe aligned to downlink at DL subframe 2 of the next radio frame is indicated at block 830. Such techniques may be implemented in TDD systems, for example. In some examples, in TDD uplink/downlink (UL/DL) configuration 3, there are 6 contiguous DL frames (SF 5 to SF 0), in TDD UL/DL configuration 0, 3 DL subframes may be used for staggering. In some air-to-ground systems (e.g., those that use TDD configurations with 20 ms periodicity), the change may be implemented during the radio frame which has maximum contiguous downlink subframes.

As the UL timing jumps in TDD systems are done over DL subframes, it does not affect the base station slew rate restrictions for UL frames. Additionally, because there are multiple DL frames, the abrupt UL timing change can be done staggered over multiple DL frames, thereby simplifying implementation and avoiding catastrophic execution problems. The diagram in FIG. 8 shows this process for a scenario where the timing advance is initially below FracTALimit before going beyond the FracTALimit boundary. A timing advance greater than the FracTALimit, as discussed above, may include a timing retard along with an integer timing advance. With the timing retard already achieved at the end of the transition process, as shown in FIG. 8, the integer timing advance is also applied in the first scheduled subframe that could carry either PUSCH or PUCCH signals. Together, the integer timing advance and the timing retard provide the required TA that is greater than the FracTALimit.

Figure 9:
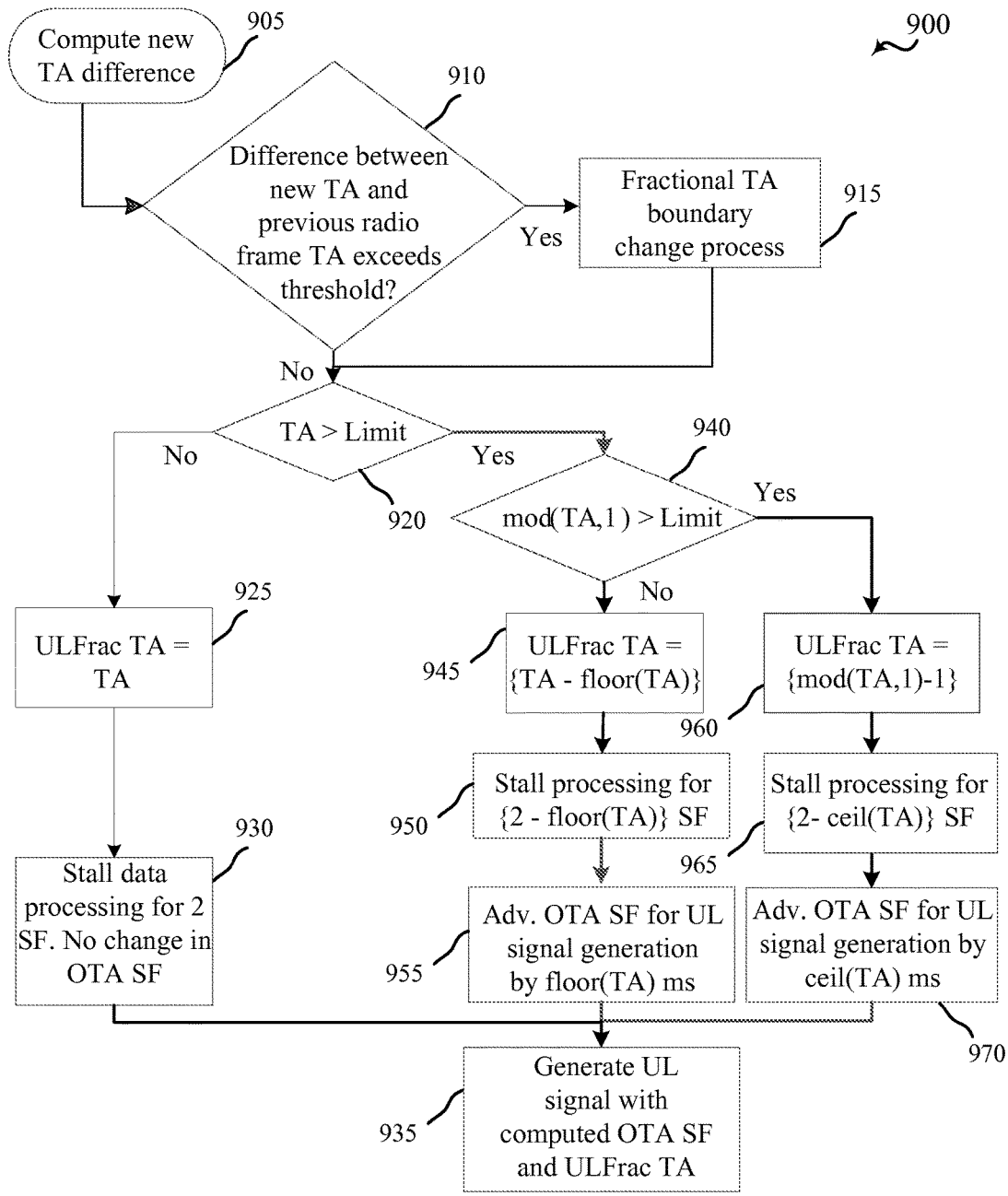
FIG. 9 shows a flowchart illustrating a method for timing advance implementation in accordance with various aspects of the disclosure.

With reference now to FIG. 9, a flow chart 900 for implementing timing advance techniques is described for various aspects of the disclosure. Such techniques may apply timing advances for a 350 km cell, for example. The TA of flow chart 900 may be in units of ms; however, other units may be used. At block 905, a TA difference is computed. In some cases, the TA difference may be determined by computing the new TA and comparing the new TA to the currently applied TA. In such a scenario, the new TA may be determined by utilizing information obtained from one or more external or internal entities (e.g., an internal receiver time tracking loop, a base station, a timing advance generator, etc.).

At block 910, it is determined if the absolute value of the difference between the new TA and previous radio frame TA exceeds a threshold for crossing a fractional TA boundary. If the TA difference does exceed the threshold, a fractional TA boundary change process 915 is performed, such as described above with respect to FIG. 8. If the TA difference threshold is not exceeded at block 910, it is determined if the TA (e.g., the new TA computed at 905) exceeds a fractional TA limit (referred to as Limit in FIG. 9), at block 920. If the TA does not exceed the fractional TA limit, the uplink fractional TA (ULFrac TA) is set to the required TA, as indicated at block 925. At block 930, data processing may be stalled for two subframes, and no change is present in the Over The Air (OTA) subframes (OTA SF). At block 935, the UE generates the uplink transmission signal with computed OTA subframe characteristics and TA uplink fractional component.

If the TA does exceed the fractional component limit at block 920, it is determined if the modulus, MOD(TA,1), exceeds the fractional TA limit (indicated as Limit in FIG. 9). If MOD(TA,1) does not exceeds the fractional TA limit, the uplink fractional TA component is set as the total TA minus the floor of TA, as indicated at block 945. Here, the floor of TA (floor(TA)) may refer to a mathematical function that takes in the total TA (e.g., in ms units) as an argument and uses mathematical operations to output the largest integer not greater than TA expressed as a real number. At block 950, the UE stalls processing for 2 minus floor of TA subframes. At block 955, the UE advances the OTA subframe characteristics for uplink signal generation by the number of floor(TA) subframes, and the operations of block 935 are performed. If, at block 940, it is determined that MOD(TA,1) exceeds the fractional TA limit at block 940, the uplink fractional TA component is set as a timing retard based on MOD(TA,1)-1, as indicated at block 960. At block 965, the UE stalls processing for 2 minus the ceiling of TA. Here, the ceiling of TA (ceiling(TA)) may refer to a mathematical function that takes in the total TA value (e.g., in ms) as an argument and uses mathematical operations to output the smallest integer TA Value that is not less than TA expressed as a real number. At block 970, the UE advances the OTA subframe characteristics for uplink signal generation by the number based on the ceiling(TA) subframes, and the operations of block 935 are performed.

Thus, the flow chart 900 of FIG. 9, based on the total timing advance required, computes three parameters: the integer timing advance applied (which is used to compute the advance in time units of the uplink subframe that determines the subframe position in which it is sent Over The Air (e.g., in an OTA subframe), the number of stall subframes required in the last stage of uplink signal generation, and the fractional timing advance/retard applied to the uplink signal generation timing of the OTA uplink subframe. Although the present example is directed towards an integer timing advance of up to 2 subframes, the techniques disclosed herein may be implemented for an integer timing advance of any value, providing the appropriate frame structure modifications are made.

Figure 10A:
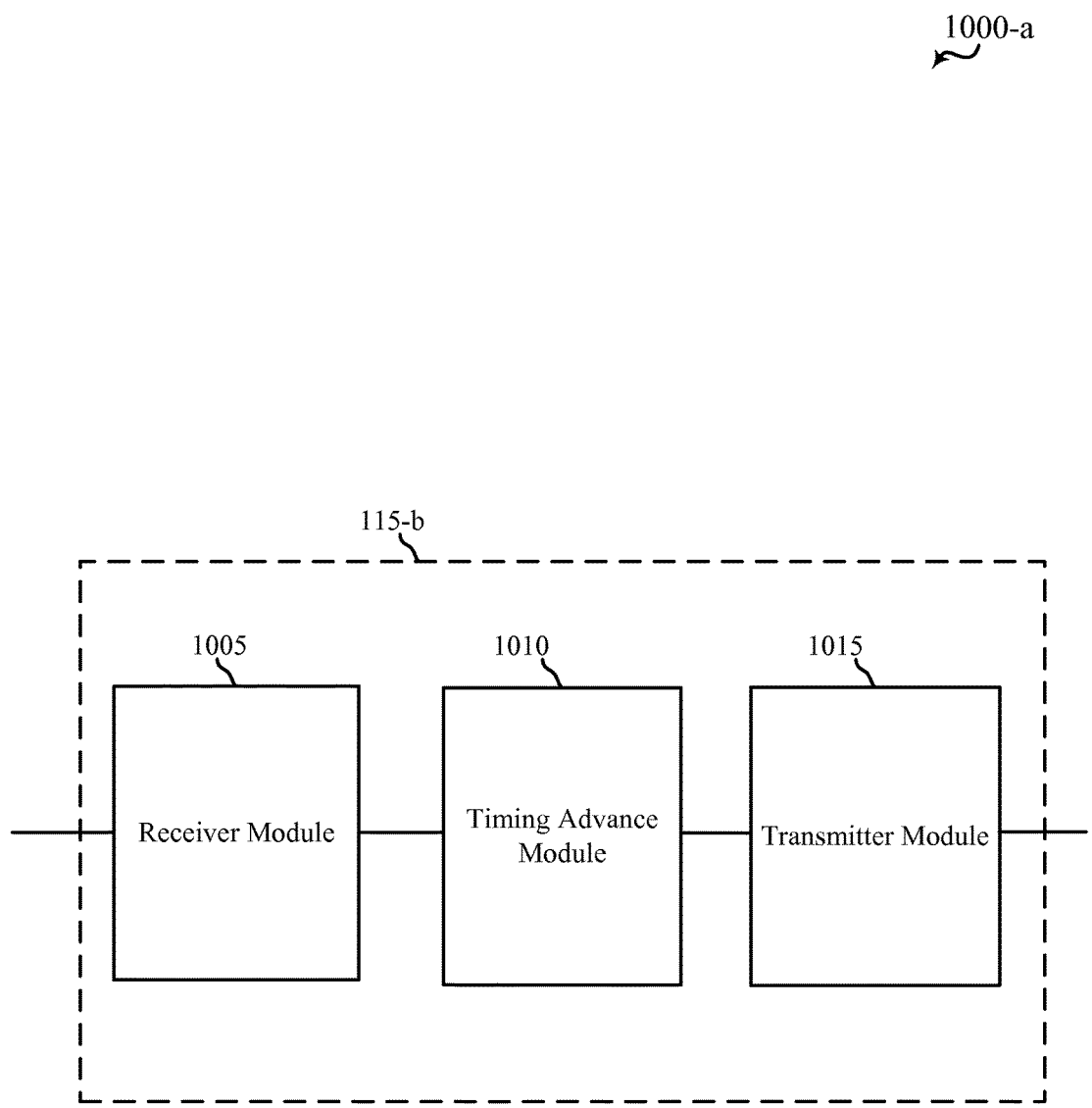
FIG. 10A shows a block diagram of a device for timing advance implementation in accordance with various aspects of the disclosure.

FIG. 10A shows a block diagram 1000-a of a UE 115-b for improved timing advance operation for wireless communications in accordance with various embodiments. The UE 115-a may be an example of one or more aspects of a UE 115 described with reference to FIG. 1. The UE 115-a may include a receiver 1005, a timing advance module 1010, or a transmitter 1015. The UE 115-b may also include a processor. Each of these components may be in communication with each other.

The components of the UE 115-b may, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 1005 may receive information such as packets, user data, or control information associated with various information channels (e.g., control channels, data channels, etc.). Information may be passed on to the timing advance module 1010, and to other components of the UE 115-b. In some examples, the receiver 1005 may be configured to receive timing advance information from a timing advance generator associated with the UE 115-b. In some examples, the timing advance generator may continuously generate timing advance information based on a position of the UE relative to a serving base station, velocity, and heading information of the UE 115-b.

The timing advance module 1010 may be configured to perform functions related to adjustment of timing for transmission of uplink subframes to a base station, similarly as discussed above. Specifically, the timing advance module 1010 may be configured to determine an integer component of a timing advance, and a fractional component of the timing advance. The timing advance module 1010 may implement the timing advance such that uplink subframes transmitted from the transmitter 1015 arrive at the serving base station substantially in synchronization with other subframes transmitted to the base station.

The transmitter 1015 may transmit the one or more signals received from other components of the UE 115-b. In some examples, the transmitter 1015 may be collocated with the receiver 1005 in a transceiver module. The transmitter 1015 may include a single antenna, or it may include a plurality of antennas. In some examples, the transmitter 1015 may be configured to transmit the data using resources received in a grant of UL resources.

Figure 10B:
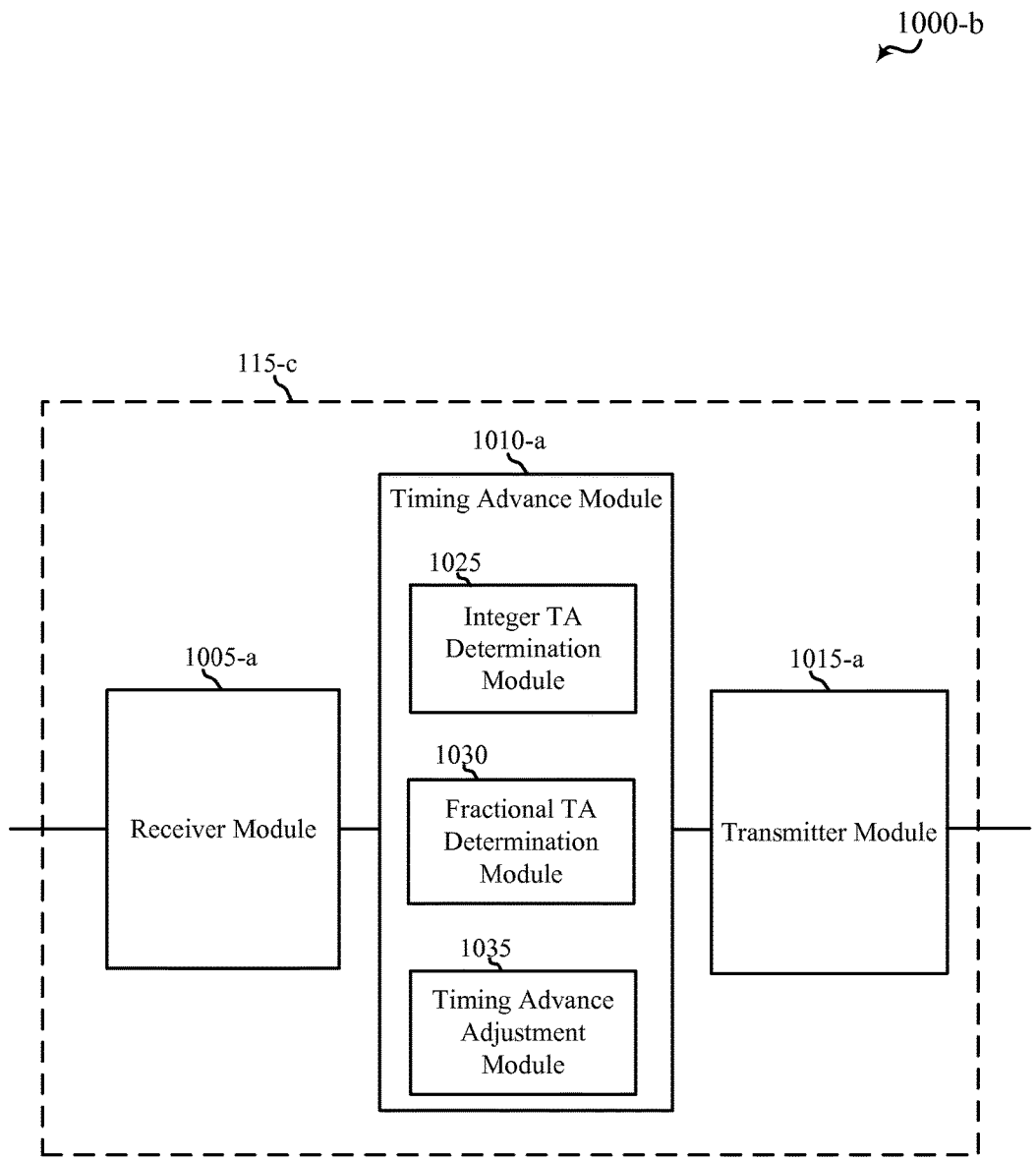
FIG. 10B shows a block diagram of another device for timing advance implementation in accordance with various aspects of the disclosure.

FIG. 10B shows a block diagram 1000 of a UE 115-c for improved timing advance operations in accordance with various aspects of the present disclosure. The UE 115-c may be an example of one or more aspects of a UE 115 described with reference to FIG. 1 or 10A. The UE 115-c may include a receiver 1005-a, a timing advance module 1010-a, or a transmitter 1015-a. The UE 115-c may also include a processor. Each of these components may be in communication with each other. The timing advance module 1010-a may also include an integer TA determination module 1025, a fractional TA determination module 1030, and a timing advance adjustment module 1035. Collectively, the timing advance module 1010-a and modules 1025, 1030, 1035 may implement one or more aspects of timing advance implementation as discussed above with respect to FIGS. 2-9.

The components of the UE 115-c may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 1005-*a* may receive information which may be passed on to the timing advance module 1010-*a*, and to other components of the UE 115-*c*. The receiver 1005-*a* may be an example of receiver 1005 of FIG. 10. The timing advance module 1010-*a* may be configured to perform the operations described above with reference to FIG. 10A, and may be an example of timing advance module 1010 of FIG. 10A. The transmitter 1015-*a* may transmit the one or more signals received from other components of the UE 115-*c*. The transmitter 1015-*a* may be an example of transmitter 1015 of FIG. 10A.

Figure 11:
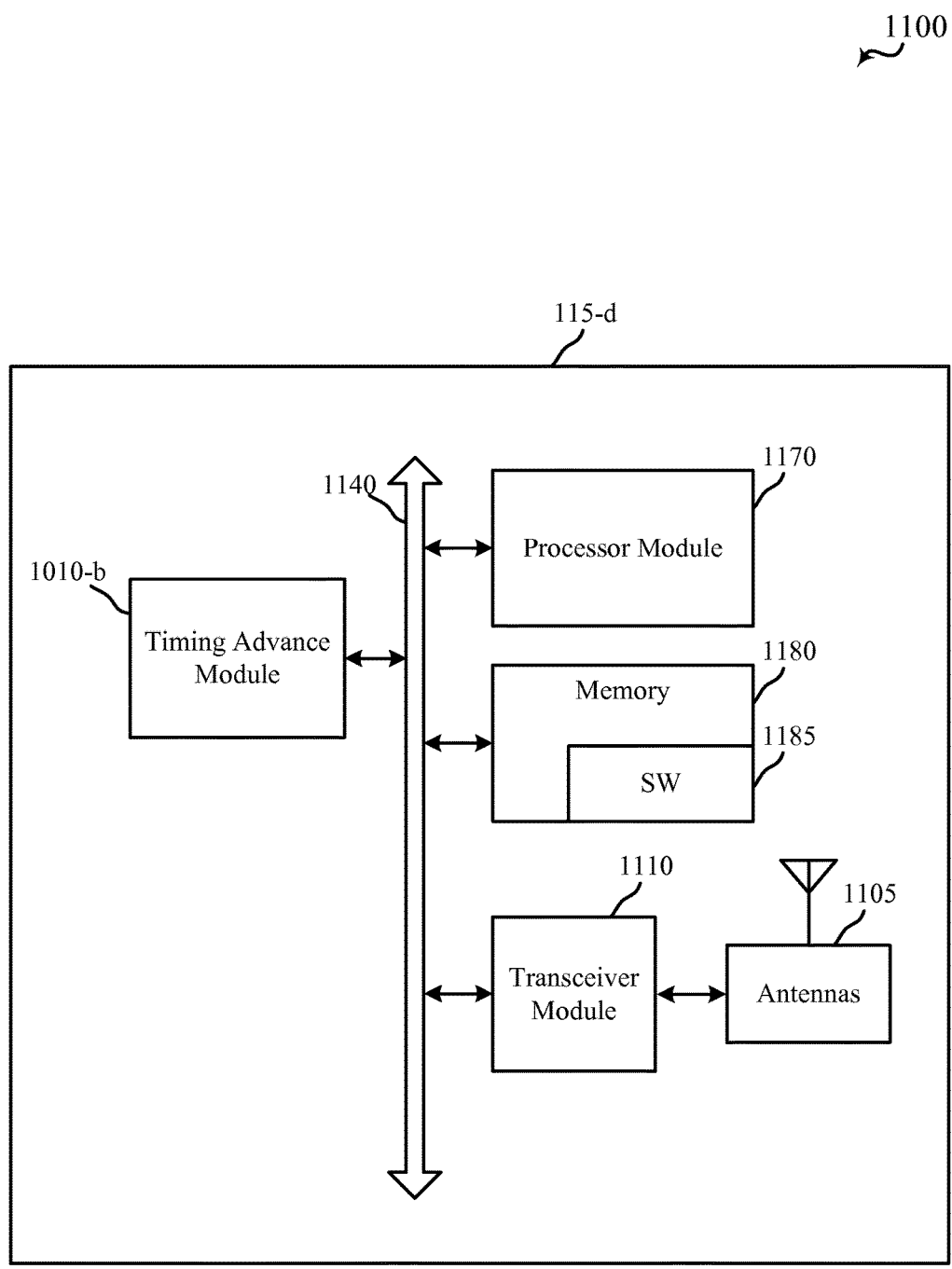
FIG. 11 illustrates a block diagram of a user equipment for timing advance implementation in accordance with various aspects of the disclosure.

FIG. 11 shows a diagram of a system 1100 for improved timing advance operation in accordance with various embodiments. System 1100 may include a UE 115-*d*, which may be an example of a UE 115 with reference to FIG. 1, 10A, or 10B. The UE 115-*d* may include a timing advance module 1010-*b*, which may be an example of a timing advance module 1010 of FIG. 10A or FIG. 10B. The UE 115-*d* may also include a processor module 1170, and memory 1180 (including software (SW) 1185), a transceiver module 1110, and one or more antenna(s) 1105, which each may communicate, directly or indirectly, with each other (e.g., via one or more buses 1140). The transceiver module 1110 may be configured to communicate bi-directionally, via the antenna(s) 1105 or one or more wired or wireless links, with one or more networks, as described above. For example, the transceiver module 1110 may be configured to communicate bi-directionally with a base station 105 of FIG. 1. The transceiver module 1110 may include a modem configured to modulate the packets and provide the modulated packets to the antenna(s) 1105 for transmission, and to demodulate packets received from the antenna(s) 1105. While the UE 115-*d* may include a single antenna 1105, the UE 115-*d* may also have multiple antennas 1105 capable of concurrently transmitting or receiving multiple wireless transmissions. The transceiver module 1110 may also be capable of concurrently communicating with one or more base stations 105.

The memory 1180 may include random access memory (RAM) and read only memory (ROM). The memory 1180 may store computer-readable, computer-executable software/firmware code 1185 containing instructions that are configured to, when executed, cause the processor module 1170 to perform various functions described herein (e.g., timing advance techniques, etc.). Alternatively, the software/firmware code 1185 may not be directly executable by the processor module 1170 but be configured to cause a computer (e.g., when compiled and executed) to perform functions described herein. The processor module 1170 may include an intelligent hardware device (e.g., a central processing unit (CPU), a microcontroller, an ASIC, etc. may include RAM and ROM). The memory 1180 may store computer-readable, computer-executable software/firmware code 1185 containing instructions that are configured to, when executed, cause the processor module 1170 to perform various functions described herein. Alternatively, the software/firmware code 1185 may not be directly executable by the processor module 1170 but be configured to cause a computer (e.g., when compiled and executed) to perform functions described herein. The processor module 1170 may include an intelligent hardware device (e.g., CPU, a microcontroller, an ASIC, etc.).

Figure 12:
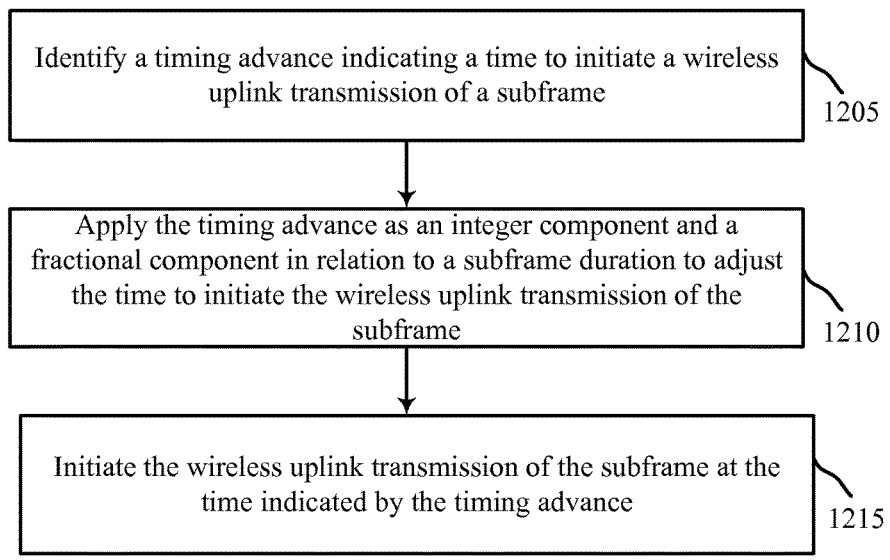
FIG. 12 shows a flowchart illustrating a method for timing advance implementation in accordance with various aspects of the disclosure.

FIG. 12 shows a flowchart 1200 illustrating a method for timing advance in a wireless communications system in accordance with various aspects of the disclosure. The functions of flowchart 1200 may be implemented by a UE 115 or its components as described with reference to FIG. 1, 10A, 10B, or 11. In certain examples, the blocks of the flowchart 1200 may be performed by the timing advance module 1010.

At block 1205, the UE may identify a timing advance indicating a time to initiate a wireless uplink transmission of a subframe. In certain examples, the functions of block 1205 may be performed by the timing advance module 1010 as described above with reference to FIG. 10A, 10B, or 11, or by the integer TA determination module 1025 and the fractional TA determination module 1030 of FIG. 10B.

At block 1210, the UE may apply the timing advance as an integer component and a fractional component in relation to a subframe duration to adjust the time to initiate the wireless uplink transmission of the subframe. In certain examples, the functions of block 1210 may be performed by the timing advance module 1010 as described above with reference to FIG. 10A, 10B, or 11, or by the timing advance adjustment module 1035 of FIG. 10B.

At block 1215, the UE may initiate the wireless uplink transmission of the subframe at the time indicated by the timing advance. In certain examples, the functions of block 1215 may be performed by the timing advance module 1010 as described above with reference to FIG. 10A, 10B, or 11, or by the timing advance adjustment module 1035 of FIG. 10B.

It should be noted that the method of flowchart 1200 is just one implementation and that the operations of the method, and the steps may be rearranged or otherwise modified such that other implementations are possible.

Figure 13:
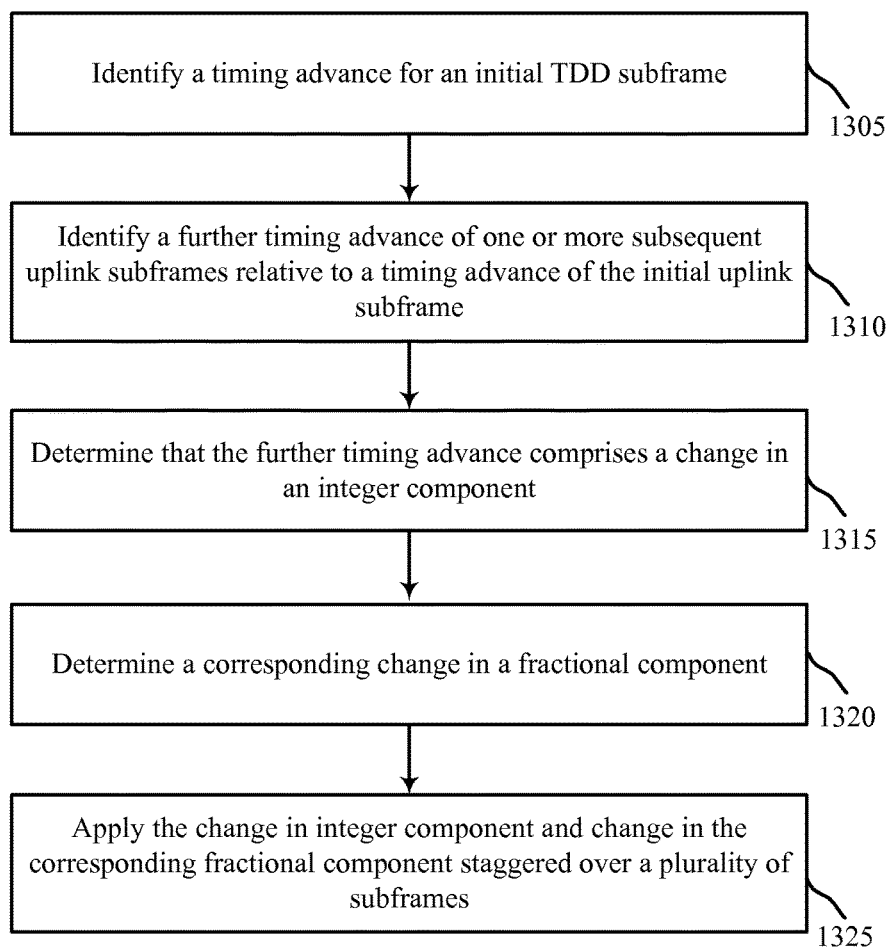
FIG. 13 shows a flowchart illustrating a method for timing advance implementation in accordance with various aspects of the disclosure.

FIG. 13 shows a flowchart 1300 illustrating a method for timing advance in a wireless communications system in accordance with various aspects of the disclosure. The functions of flowchart 1300 may be implemented by a UE 115 or its components as described with reference to FIG. 1, 10A, 10B, or 11. In certain examples, the blocks of the flowchart 1300 may be performed by the timing advance module 1010.

At block 1305, the UE may identify a timing advance for an initial subframe. In certain examples, the functions of block 1305 may be performed by the timing advance module 1010 as described above with reference to FIG. 10A, 10B, or 11, or by the integer TA determination module 1025 and the fractional TA determination module 1030 of FIG. 10B. At block 1310, the UE may identify a further timing advance of one or more subsequent uplink subframes relative to a timing advance of the initial uplink subframe. In certain examples, the functions of block 1310 may be performed by the timing advance module 1010 as described above with reference to FIG. 10A, 10B, or 11, or by the integer TA determination module 1025 and the fractional TA determination module 1030 of FIG. 10B.

At block 1315, the UE may determine that the further timing advance comprises a change in an integer component. In certain examples, the functions of block 1315 may be performed by the timing advance module 1010 as described above with reference to FIG. 10A, 10B, or 11, or by the fractional TA determination module 1030 of FIG. 10B. At block 1320, the UE may determine a corresponding change in a fractional component. In certain examples, the functions of block 1320 may be performed by the timing advance module 1010 as described above with reference to FIG. 10A, 10B, or 11, or by the timing advance adjustment module 1035 of FIG. 10B. At block 1325, the UE may apply the change in integer component and change in the corresponding fractional component staggered over a plurality of subframes. The number of subframes over which the change in TA may be staggered may depend, for example, on the magnitude of the change of the TA, as well as on the number of downlink subframes available for making the change to the TA. In certain examples, the functions of block 1325 may be performed by the timing advance module 1010 as described above with reference to FIG. 10A, 10B, or 11, or by the timing advance adjustment module 1035 of FIG. 10B.

It should be noted that the method of flowchart 1300 is just one implementation and that the operations of the method, and the steps may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include compact disk (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and Long Term Evolution (LTE)-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
identifying a timing advance that indicates a time to initiate a wireless uplink transmission of a subframe;
applying the timing advance as an integer component and a fractional component in relation to a subframe duration to adjust the time to initiate the wireless uplink transmission of the subframe, wherein applying the integer component comprises adjusting the time to initiate the wireless uplink transmission of the subframe to correspond to an earlier downlink subframe boundary of a sequence of subframes; and
initiating the wireless uplink transmission of the subframe at the time indicated by the timing advance.

2. The method of claim 1, wherein the sequence of subframes correspond to a sequence of time division duplexing (TDD) subframes.

3. The method of claim 1, wherein the sequence of subframes correspond to a sequence of frequency division duplexing (FDD) subframes.

4. The method of claim 1, wherein the applying the timing advance as the fractional component comprises advancing the time to initiate the wireless uplink transmission by an amount that is less than the subframe duration.

5. The method of claim 1, wherein the applying the timing advance as the fractional component comprises delaying the time to initiate the wireless uplink transmission by an amount that is less than the subframe duration.

6. The method of claim 1, wherein the applying the timing advance comprises:
comparing the identified timing advance to a threshold value;
determining an adjustment to the integer component based at least in part on the comparison; and
calculating the fractional component as a difference between the identified timing advance and an adjusted integer component based on the determined adjustment.

7. The method of claim 6, wherein the fractional component is less than the subframe duration.

8. The method of claim 1, wherein the subframe is an uplink subframe transmitted from a user equipment to a base station.

9. The method of claim 8, wherein the user equipment comprises an aircraft transmitter and the base station comprises a ground station.

10. The method of claim 1, wherein the wireless uplink transmission comprises a transmission on one or more of a physical random access channel (PRACH), a sounding reference signal (SRS), a physical uplink shared channel (PUSCH) and associated demodulation reference signal (DMRS), or a physical uplink control channel (PUCCH) and associated (DMRS).

11. The method of claim 1, wherein the subframe is an initial uplink subframe, and further comprising:
identifying a further timing advance of one or more subsequent uplink subframes relative to the timing advance of the initial uplink subframe, wherein the subsequent uplink subframes correspond to a sequence of time division duplexing (TDD) subframes.

12. The method of claim 11, further comprising:
determining that the further timing advance comprises a change in the integer component; and
applying the further timing advance during one or more downlink subframes.

13. The method of claim 12, wherein the applying the change in the fractional component is staggered over a plurality of downlink subframes.

14. The method of claim 1, further comprising:
performing uplink data processing on the subframe prior to the initiating the wireless uplink transmission of the subframe, the uplink data processing performed according to a maximum value of the integer component; and
stalling a portion of the uplink data processing in response to the integer component being less than the maximum value of the integer component.

15. The method of claim 1, further comprising:
receiving timing advance information from an internal source;
receiving timing advance information from an external source, wherein identifying the timing advance is based at least in part on the timing advance information received from the internal source and the external source.

16. The method of claim 15, further comprising:
receiving timing advance information from a base station that is separate from the external source, wherein identifying the timing advance is based at least in part on the timing advance information from the base station, and wherein the timing advance information of the external source comprises at least one of position, velocity, and acceleration associated with a wireless communication device initiating the wireless uplink transmission.

17. An apparatus for wireless communication, comprising:
means for identifying a timing advance that indicates a time to initiate a wireless uplink transmission of a subframe;
means for applying the timing advance as an integer component and a fractional component in relation to a subframe duration to adjust the time to initiate the wireless uplink transmission of the subframe, wherein applying the integer component comprises adjusting the time to initiate the wireless uplink transmission of the subframe to correspond to an earlier downlink subframe boundary of a sequence of subframes; and means for initiating the wireless uplink transmission of the subframe at the time indicated by the timing advance.

18. The apparatus of claim 17, wherein the means for applying the timing advance as the fractional component comprises means for advancing the time to initiate the wireless uplink transmission by an amount that is less than the subframe duration.

19. The apparatus of claim 17, wherein the means for applying the timing advance as the fractional component comprises means for delaying the time to initiate the wireless uplink transmission by an amount that is less than the subframe duration.

20. The apparatus of claim 17, wherein the means for applying the timing advance comprises:
   means for comparing the identified timing advance to a threshold value;
   means for determining an adjustment to the integer component based at least in part on the comparison; and
   means for calculating the fractional component as a difference between the identified timing advance and an adjusted integer component based on the determined adjustment.

21. An apparatus for wireless communication, comprising:
   a processor;
   memory in electronic communication with the processor; and
   instructions stored in the memory, the instructions being executable by the processor to:
   identify a timing advance indicating a time to initiate a wireless uplink transmission of a subframe;
   apply the timing advance as an integer component and a fractional component in relation to a subframe duration to adjust the time to initiate the wireless uplink transmission of the subframe, wherein applying the integer component comprises adjusting the time to initiate the wireless uplink transmission of the subframe to correspond to an earlier downlink subframe boundary of a sequence of subframes; and
   initiate the wireless uplink transmission of the subframe at the time indicated by the timing advance.

22. The apparatus of claim 21, wherein the instructions are further executable by the processor to advance the time to initiate the wireless uplink transmission by an amount that is less than the subframe duration.

23. The apparatus of claim 21, wherein the instructions are further executable by the processor to delay the time to initiate the wireless uplink transmission by an amount that is less than the subframe duration.

24. A non-transitory computer-readable medium storing computer executable code for wireless communications, the code executable by a processor to:
   identify a timing advance indicating a time to initiate a wireless uplink transmission of a subframe; and
   apply the timing advance as an integer component and a fractional component in relation to a subframe duration to adjust the time to initiate the wireless uplink transmission of the subframe, wherein applying the integer component comprises adjusting the time to initiate the wireless uplink transmission of the subframe to correspond to an earlier downlink subframe boundary of a sequence of subframes; and
   initiate the wireless uplink transmission of the subframe at the time indicated by the timing advance.

25. The non-transitory computer-readable medium of claim 24, wherein the code is executable by the processor to:
   advance the time to initiate the wireless uplink transmission by an amount that is less than the subframe duration.

26. The non-transitory computer-readable medium of claim 24, wherein the code is executable by the processor to:
   delay the time to initiate the wireless uplink transmission by an amount that is less than the subframe duration.

* * * * *